United States Patent
Okabe et al.

(10) Patent No.: US 12,294,102 B2
(45) Date of Patent: May 6, 2025

(54) AIR VEHICLE

(71) Applicant: TOYOTA JIDOSHA KABUSHIKI KAISHA, Toyota (JP)

(72) Inventors: Hiroki Okabe, Mishima (JP); Tomohiko Kaneko, Yokohama (JP); Tomohiro Shinagawa, Shizuoka-ken (JP); Yoshihiro Shinozaki, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 471 days.

(21) Appl. No.: 17/659,930

(22) Filed: Apr. 20, 2022

(65) Prior Publication Data

US 2022/0340045 A1    Oct. 27, 2022

(30) Foreign Application Priority Data

Apr. 23, 2021    (JP) .................... 2021-073155

(51) Int. Cl.
  *H01M 50/269*    (2021.01)
  *B60L 50/70*     (2019.01)
  *G05D 3/12*      (2006.01)
  *B60L 58/30*     (2019.01)

(52) U.S. Cl.
  CPC ........... *H01M 50/269* (2021.01); *B60L 50/70* (2019.02); *G05D 3/127* (2013.01); *B60L 58/30* (2019.02); *B60L 2200/10* (2013.01); *H01M 2250/20* (2013.01)

(58) Field of Classification Search
  CPC .. B60L 50/70; H01M 50/269; H01M 2250/20
  See application file for complete search history.

(56) References Cited

U.S. PATENT DOCUMENTS

| | | |
|---|---|---|
| 2014/0023945 A1 | 1/2014 | Epstein et al. |
| 2016/0141655 A1 | 5/2016 | Naganuma et al. |
| 2017/0054163 A1 | 2/2017 | Kawai |
| 2018/0123148 A1 | 5/2018 | Itoga |
| 2018/0297461 A1 | 10/2018 | Tambo et al. |
| 2020/0403257 A1 | 12/2020 | Itou et al. |
| 2023/0069975 A1* | 3/2023 | Quartarone ............. H01M 8/22 |
| 2023/0138892 A1* | 5/2023 | Wang ................ H01M 8/04686 60/773 |

FOREIGN PATENT DOCUMENTS

| | | | |
|---|---|---|---|
| EP | 3 021 405 A1 | | 5/2016 |
| JP | 2011008986 A | * | 1/2011 |
| JP | 2016096058 A | | 5/2016 |
| JP | 2017-081559 A | | 5/2017 |
| JP | 2020205203 A | | 12/2020 |

* cited by examiner

*Primary Examiner* — Amanda C. Walke
(74) *Attorney, Agent, or Firm* — Dickinson Wright, PLLC (57) ABSTRACT

To provide an air vehicle configured to stabilize the power output of a fuel cell by securing the generated water discharge property of the fuel cell. An air vehicle, wherein the air vehicle comprises two or more fuel cells; wherein each fuel cell comprises an anode outlet manifold; and wherein each fuel cell is disposed in the air vehicle so that water discharge directions of the anode outlet manifolds are different from each other.

4 Claims, 3 Drawing Sheets

AIR VEHICLE

TECHNICAL FIELD

The present disclosure relates to an air vehicle.

BACKGROUND

A fuel cell (FC) is a power generation device which is composed of a single unit fuel cell (hereinafter, it may be referred to as "cell") or a fuel cell stack composed of stacked unit fuel cells (hereinafter, it may be referred to as "stack") and which generates electrical energy by electrochemical reaction between fuel gas (e.g., hydrogen) and oxidant gas (e.g., oxygen). In many cases, the fuel gas and oxidant gas actually supplied to the fuel cell, are mixtures with gases that do not contribute to oxidation and reduction. Especially, the oxidant gas is often air containing oxygen.

Hereinafter, fuel gas and oxidant gas may be collectively and simply referred to as "reaction gas" or "gas". Also, a single unit fuel cell and a fuel cell stack composed of stacked unit cells may be referred to as "fuel cell".

Various studies have been made on fuel cells.

For example, Patent Literature 1 discloses an aircraft using fuel cells.

Patent Literature 1: Japanese Patent Application Laid-Open (JP-A) No. 2017-081559

In the case of an air vehicle in which a fuel cell is mounted, the air vehicle fuselage is inclined or subjected to input G when the air vehicle changes its direction, changes its altitude, or encounters a gust of wind.

When the fuselage is inclined, the fuel cell is also inclined. Depending on the inclined angle of the fuselage, the size and direction of the input G, and the output of the fuel cell, there is a problem in that generated water in the anode outlet (fuel gas outlet-side) manifold of the fuel cell cannot be discharged to the outside of the fuel cell.

Hydrogen is less likely to flow into cells in a portion of the fuel cell, in which large amounts of water is generated; hydrogen deficiency occurs; and the durability of the fuel cell is decreased, accordingly. As a result, it is necessary to impose a limit on the output and to stop the system.

SUMMARY

The present disclosure were achieved in light of the above circumstances. An object of the present disclosure is to provide an air vehicle configured to stabilize the power output of a fuel cell by securing the generated water discharge property of the fuel cell.

The air vehicle of the present disclosure is an air vehicle, wherein the air vehicle comprises two or more fuel cells; wherein each fuel cell comprises an anode outlet manifold; and
wherein each fuel cell is disposed in the air vehicle so that water discharge directions of the anode outlet manifolds are different from each other.

The air vehicle of the present disclosure is an air vehicle, wherein the air vehicle comprises one or more fuel cells; wherein the or each cell comprises an anode outlet manifold; and
wherein the or each fuel cell is disposed in the air vehicle so that a water discharge direction of the anode outlet manifold is the same direction as a travel direction of the air vehicle.

The or each fuel cell may comprise a rotation axis which is freely rotatable with respect to the air vehicle.

The rotation axis may be disposed on an opposite side to the water discharge direction, with respect to a gravity center of the or each fuel cell.

The air vehicle may further comprise a fuel cell system, wherein the fuel cell system comprises:
the two or more fuel cells or the one or more fuel cells,
a fuel gas system for supplying fuel gas to the or each fuel cell,
an angle sensor for measuring an inclined angle of the or each fuel cell,
a gravity acceleration sensor for measuring a gravity acceleration applied to the or each fuel cell,
an output sensor for measuring an output of the or each fuel cell, and
a controller;
wherein the fuel gas system comprises a fuel gas supplier;
wherein the controller makes at least one determination selected from the group consisting of a determination as to whether or not the inclined angle of the or each fuel cell measured toy the angle sensor, is equal to or more than a predetermined angle, a determination as to whether or not the gravity acceleration applied to the or each fuel cell measured by the gravity acceleration sensor, is equal to or more than a predetermined gravity acceleration, and a determination as to whether or not the output of the or each fuel cell measured toy the output sensor, is less than a predetermined output; and
wherein, when the controller determines that any one of the following conditions is satisfied, the controller increases a fuel gas supply from the fuel gas supplier to the or each fuel cell satisfying the condition; a condition that the inclined angle of the or each fuel cell is equal to or more than the predetermined angle, a condition that the gravity acceleration applied to the or each fuel cell is equal to or more than the predetermined gravity acceleration, and a condition that the output of the or each fuel cell is less than the predetermined output.

The air vehicle may be an airplane or a vertical takeoff and landing aircraft.

According to the air vehicle of the present disclosure, the power output of the fuel cell can be stabilized by securing the generated water discharge property of the fuel cell.

BRIEF DESCRIPTION OF THE DRAWINGS

In the accompanying drawings.

DETAILED DESCRIPTION

1. First Embodiment

The air vehicle of the present disclosure is an air vehicle, wherein the air vehicle comprises two or more fuel cells; wherein each fuel cell comprises an anode outlet manifold; and
wherein each fuel cell is disposed in the air vehicle so that water discharge directions of the anode outlet manifolds are different from each other.

The air vehicle of the first embodiment comprises two or more fuel cells.

Each fuel cell comprises an anode outlet manifold.

Each fuel cell is disposed in the air vehicle so that water discharge directions of the anode outlet manifolds are different from each other.

In the air vehicle of the first embodiment in which the two or more fuel cells are mounted, the fuel cells are disposed so that the water discharge directions and water discharge angles of the fuel cells are different from each other.

Accordingly, the generated water discharge property of the fuel cells is ensured, and the power output of the fuel cells can be stabilized.

The water discharge directions of the anode outlet manifolds of the fuel cells are not particularly limited, as long as the directions are different from each other. The directions may be symmetric. Accordingly, when the air vehicle is inclined to left or right, the water discharge property of the fuel cell or fuel cells on one side is promoted.

Figure 1:
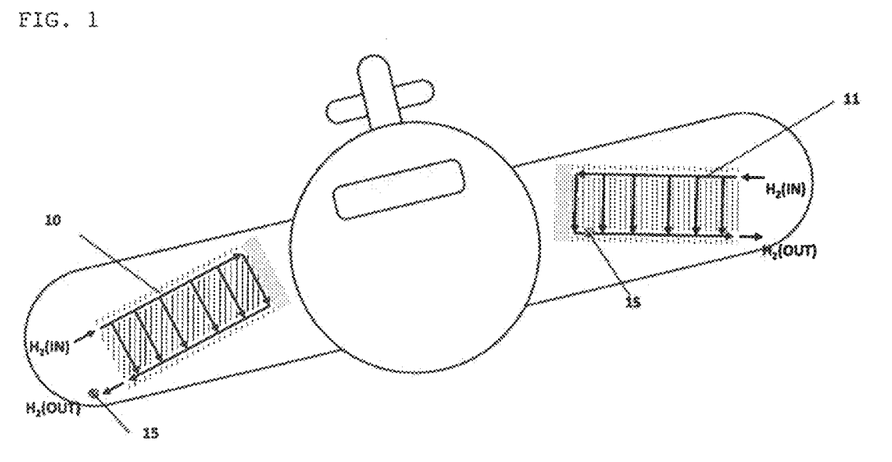
FIG. 1 is a schematic diagram of an example of the air vehicle of the first embodiment.

FIG. 1 is a schematic diagram of an example of the air vehicle of the first embodiment.

FIG. 1 is a schematic front view of the air vehicle. Arrows shown in FIG. 1 indicate the flow of hydrogen (fuel gas) in the manifolds of the fuel cells. Two fuel cells 10 and 11 are mounted in the air vehicle shown in FIG. 1. One of the fuel cells 10 and 11 is disposed in the left wing (on the observer's right) of the air vehicle, and the other is disposed in the right wing (on the observer's left). Also, the fuel cells 10 and 11 are disposed so that the water discharge directions of the anode outlet manifolds are symmetric. As a result, for example, when the air vehicle is inclined, it is difficult to discharge water (generated water) 15 from the fuel cell 11 on the observer's right; however, it is easy to discharge the water 15 from the fuel cell 10 on the observer's left. Accordingly, it is prevented that both the fuel cells 10 and 11 insufficiently discharge water at the same time, and that the output of the fuel cells decreases.

Also, the generated water discharge property may be secured by temporarily increasing the fuel gas flow rate of the fuel cell 11 on the observer's right, which has difficulty in water discharge, according to the inclined angle of the air vehicle, the input G (the size and direction) and the output of the fuel cell. Excellent fuel efficiency is obtained by increasing the fuel gas flow rate of only the fuel cell 11 having difficulty in water discharge.

2. Second Embodiment

The air vehicle of the present disclosure is an air vehicle, wherein the air vehicle comprises one or more fuel cells;
wherein the or each cell comprises an anode outlet manifold; and
wherein the or each fuel cell is disposed in the air vehicle so that a water discharge direction of the anode outlet manifold is the same direction as a travel direction of the air vehicle.

The air vehicle of the second embodiment comprises one or more fuel cells.

The or each cell comprises an anode outlet manifold.

The or each fuel cell is disposed in the air vehicle so that a water discharge direction of the anode outlet manifold is the same direction as a travel direction of the air vehicle.

In the air vehicle of the second embodiment in which one or more fuel cells are mounted, the or each fuel cell is mounted so that the water discharge direction of the anode outlet manifold follows the travel direction of the air vehicle.

Accordingly, when the fuselage of the air vehicle is inclined forward and travels forward, the generated water discharge property of the or each fuel cell is secured, and the output thereof is stabilized.

In the air vehicle of the second embodiment, the or each fuel cell may include the rotation axis which is freely rotatable with respect to the air vehicle.

The rotation axis may be disposed on the opposite side to the water discharge direction, with respect to the gravity center of the or each fuel cell.

By the rotation axis, the or each fuel cell is naturally rotated in a direction in which water is easily discharged.

The rotation axis may be connected to and fixed on any one of the left, right, top and bottom surfaces of the inside of the air vehicle, as long as the or each fuel cell is freely rotatable with respect to the air vehicle.

For example, when the air vehicle is a vertical takeoff and landing aircraft such as a helicopter and drone, generally, the fuselage is inclined forward and travels forward, or the fuselage is inclined rightward or leftward and travels rightward or leftward. In this case, by disposing the rotation axis in the or each fuel cell, the or each fuel cell can be inclined rightward or leftward. Then, for example, when the fuselage is inclined rightward, the or each fuel cell rotates right around the rotation axis to be inclined in a direction in which water is easily discharged.

Figure 2:
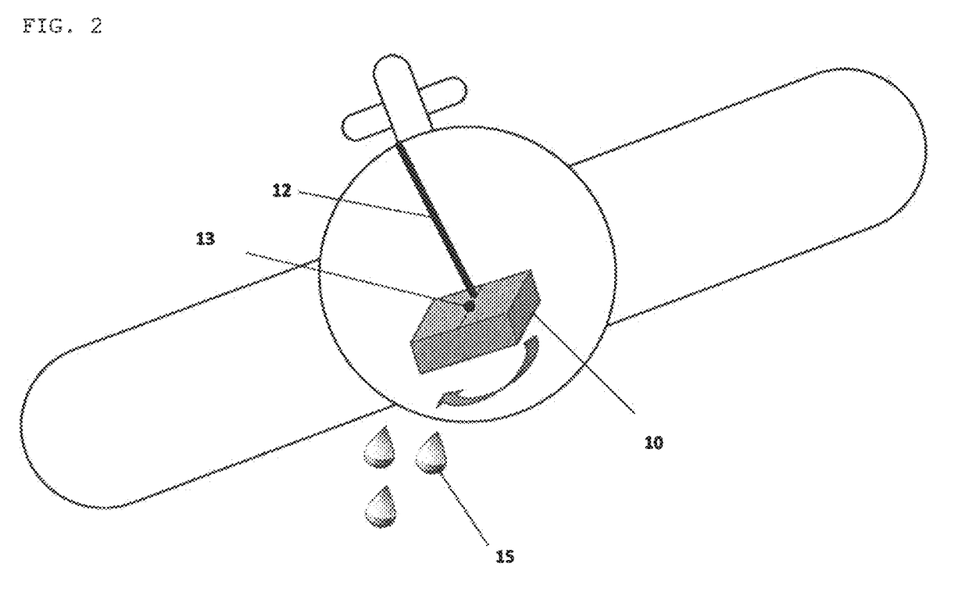
FIG. 2 is a schematic diagram of an example of the air vehicle of the second embodiment.

FIG. 2 is a schematic diagram of an example of the air vehicle of the second embodiment.

A fuel cell 10 is mounted in the air vehicle shown in FIG. 2. The fuel cell 10 includes a rotation axis 12, and the rotation axis 12 is disposed on the opposite side to the water discharge direction of the anode outlet manifold, with respect to the gravity center 13 of the fuel cell 10. Also, the rotation axis 12 is connected to and fixed on the top surface of the inside of the air vehicle, and the fuel cell 10 is freely rotatable with respect to the air vehicle. When the air vehicle is inclined, the fuel cell 10 rotates around the rotation axis 12, and the water discharge direction (the direction of discharging the water 15) becomes the same direction as the travel direction of the air vehicle. Accordingly, the water is easily discharged.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

The air vehicle of the present disclosure may be an aircraft. The aircraft may be an airplane, a vertical takeoff and landing aircraft or the like. The vertical takeoff and landing aircraft may be a helicopter, a drone or the like.

The fuel cell of the first or second embodiment of the present disclosure may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 600 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum (Pt) and ruthenium (Ru). As a catalyst-supporting material and a conductive material, examples include, but are not limited to, a carbonaceous material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the present disclosure, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron, plate, an aluminum plate and a stainless-steel plate) obtained by press-molding. The separator may function as a collector.

The fuel cell may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

In the first embodiment, each fuel cell may be disposed in the air vehicle so that the water discharge directions of the anode outlet manifolds are different from each other.

In the second embodiment, the or each fuel cell may be disposed in the air vehicle so that the water discharge direction of the anode outlet manifold is the same direction as a travel direction of the air vehicle.

The air vehicle of the first and second embodiments may further include the fuel cell system.

The fuel cell system includes the two or more fuel cells or the one or more fuel cells, a fuel gas system, an angle sensor, a gravity acceleration sensor, an output sensor and a controller.

The fuel cell system includes the angle sensor.

The angle sensor measures the inclined angle of the or each fuel cell.

The angle sensor is electrically connected to the controller. The controller detects the inclined angle of the or each fuel cell measured by the angle sensor.

As the angle sensor, a conventionally-known angle gauge or the like may be used.

The fuel cell system includes the gravity acceleration sensor.

The gravity acceleration sensor measures the gravity acceleration applied to the or each fuel cell.

The gravity acceleration sensor is electrically connected to the controller. The controller detects the gravity acceleration applied to the or each fuel cell measured by the gravity acceleration sensor.

As the gravity acceleration sensor, a conventionally-known accelerometer or the like may be used.

The fuel cell system includes the output sensor.

The output sensor measures the output of the fuel cell. The output power may be electric power, voltage or current.

The output sensor is electrically connected to the controller, and the controller detects the output of the fuel cell measured by the output sensor.

As the output sensor, a conventionally-known output meter, electric power meter, voltmeter, current meter or the like may be used.

The fuel cell system includes the fuel gas system.

The fuel gas system supplies fuel gas to the fuel cell.

The fuel gas system includes the fuel gas supplier.

The fuel gas system may further include a fuel gas supply flow path, an ejector, a circulation flow path, a gas-liquid separator, a fuel off-gas discharge flow path, a gas and water discharge valve, and so on.

The fuel gas supplier supplies the fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas supply flow path connects the fuel gas supplier and the fuel gas inlet of the fuel cell. The fuel gas supply flow path allows the fuel gas to be supplied to the anode of the fuel cell. The fuel gas inlet may be the fuel gas supply hole, the anode inlet manifold, or the like.

In the fuel gas supply flow path, the ejector may be disposed.

For example, the ejector may be disposed at a junction with the circulation flow path on the fuel gas supply flow path. The ejector supplies a mixed gas containing the fuel gas and circulation gas to the anode of the fuel cell. As the ejector, a conventionally-known ejector may be used.

A pressure control valve and a medium-pressure hydrogen sensor may be disposed in a region between the fuel gas supplier and ejector of the fuel gas supply flow path.

The pressure control valve controls the pressure of the fuel gas supplied from the fuel gas supplier to the ejector.

The pressure control valve is electrically connected to the controller. The pressure of the fuel gas supplied to the ejector may be controlled by controlling the opening/closing, opening degree or the like of the pressure control valve by the controller.

The medium-pressure hydrogen sensor is electrically connected to the controller. The controller detects the fuel gas pressure measured by the medium-pressure hydrogen sensor. The pressure of the fuel gas supplied to the ejector may be controlled by controlling the opening/closing, opening degree or the like of the pressure control valve, based on the detected pressure.

The fuel off-gas discharge flow path connects the fuel gas outlet of the fuel cell and the outside of the fuel cell system.

In the fuel off-gas discharge flow path, a gas-liquid separator may be disposed in a region between the fuel gas outlet and the outside of the fuel cell system.

The fuel off-gas discharge flow path may branch from the circulation flow path through the gas-liquid separator.

The fuel off-gas discharge flow path discharges, to the outside of the fuel cell system, the fuel off-gas discharged from the fuel gas outlet of the fuel cell. The fuel gas outlet may be the fuel gas discharge hole, the anode outlet manifold, or the like.

The gas and water discharge valve (the fuel off-gas discharge valve) may be disposed in the fuel off-gas discharge flow path. The gas and water discharge valve is disposed downstream from the gas-liquid separator in the fuel off-gas discharge flow path.

The gas and water discharge valve allows the fuel off-gas, water and the like to be discharged to the outside (of the system). The outside may be the outside of the fuel cell system, or it may be the outside of the air vehicle.

The gas and water discharge valve may be electrically connected to the controller, and the flow rate of the fuel off-gas discharged to the outside and the flow rate of the discharged water (liquid water) may be controlled by controlling the opening and closing of the gas and water discharge valve by the controller. By controlling the opening degree of the gas and water discharge valve, the pressure of the fuel gas supplied to the anode of the fuel cell (anode pressure) may be controlled.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The circulation flow path may connect the fuel gas outlet of the fuel cell and the ejector.

The circulation flow path may branch from the fuel off-gas discharge flow path and connect to the ejector disposed in the fuel gas supply flow path, thereby merging with the fuel gas supply flow path.

The circulation flow path may branch from the fuel off-gas discharge flow path through the gas-liquid separator and connect to the ejector disposed in the fuel gas supply flow path, thereby merging with the fuel gas supply flow path.

The circulation flow path allows the fuel off-gas, which is the fuel gas discharged from the fuel gas outlet of the fuel cell, to be recovered and supplied to the fuel cell as the circulation gas.

A gas circulation pump may be disposed in the circulation flow path. The gas circulation pump circulates the fuel off-gas as the circulation gas. The gas circulation pump may be electrically connected to the controller, and the flow rate of the circulation gas may be controlled by controlling ON/OFF, rotational speed, etc., of the gas circulation pump by the controller.

The gas-liquid separator (anode gas-liquid separator) may be disposed in the circulation flow path.

The gas-liquid separator may be disposed at the branch point of the fuel off-gas discharge flow path and the circulation flow path. Accordingly, the flow path from the fuel gas outlet to the gas-liquid separator may be the fuel off-gas discharge flow path or the circulation flow path.

The gas-liquid separator is disposed upstream from the gas and water discharge valve of the fuel off-gas discharge flow path.

The gas-liquid separator separates the water (liquid water) and the fuel off-gas which is the fuel gas discharged from the fuel gas outlet. Accordingly, the fuel off-gas may be returned to the circulation flow path as the circulation gas, or unnecessary gas, water and the like may be discharged to the outside by opening the gas and water discharge valve of the fuel off-gas discharge flow path. In addition, the gas-liquid separator can suppress the flow of excess water into the circulation flow path. Accordingly, the occurrence of freezing of the circulation pump or the like due to the water, can be suppressed.

The fuel cell system may include an oxidant gas system.

The oxidant gas system may include an oxidant gas supplier, an oxidant gas supply flow path, an oxidant off-gas discharge flow path, an oxidant gas bypass flow path, a bypass valve, an oxidant gas flow rate sensor, and so on.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is operated according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be the oxidant gas supply hole, the cathode inlet manifold, or the like.

The oxidant off-gas discharge flow path is connected to the oxidant gas outlet of the fuel cell. The oxidant off-gas discharge flow path allows the oxidant off-gas, which is the oxidant gas discharged from the cathode of the fuel cell, to be discharged to the outside. The oxidant gas outlet may be the oxidant gas discharge hole, the cathode outlet manifold, or the like.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The oxidant gas bypass flow path branches from the oxidant gas supply flow path, bypasses the fuel cell, and connects the branch of the oxidant gas supply flow path and the junction of the oxidant off-gas discharge flow path.

The bypass valve is disposed in the oxidant gas bypass flow path.

The bypass valve is electrically connected to the controller. By opening the bypass valve by the controller, when it is unnecessary to supply the oxidant gas to the fuel cell, the oxidant gas can bypass the fuel cell and be discharged to the outside from the oxidant off-gas discharge flow path.

The oxidant gas flow rate sensor is disposed in the oxidant gas supply flow path.

The oxidant gas flow rate sensor detects the flow rate of the oxidant gas in the oxidant gas system. The oxidant gas flow rate sensor is electrically connected to the controller. The controller may estimate the rotational speed of the air compressor from the flow rate of the oxidant gas detected by the oxidant gas flow rate sensor. The oxidant gas flow rate sensor may be disposed upstream from the oxidant gas supplier of the oxidant gas supply flow path.

As the oxidant gas flow rate sensor, a conventionally-known flow meter or the like may be used.

The fuel cell system may include the cooling system of the fuel cell.

The cooling system may include a refrigerant supplier and a refrigerant circulation flow path.

The refrigerant circulation flow path communicates between the refrigerant supply and discharge holes provided in the fuel cell, and it allows the refrigerant supplied from the refrigerant supplier to be circulated inside and outside the fuel cell.

The refrigerant supplier is electrically connected to the controller. The refrigerant supplier is operated according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The refrigerant circulation flow path may be provided with a reserve tank for storing the refrigerant.

The fuel cell system may include a secondary cell.

The secondary cell (battery) may be any chargeable and dischargeable cell. For example, the secondary cell may be a conventionally-known secondary cell such as a nickel-hydrogen secondary cell and a lithium ion secondary cell. The secondary cell may include a power storage device such as an electric double layer capacitor. The secondary cell may have a structure such that a plurality of secondary cells are connected in series. The secondary cell supplies power to the motor, the air compressor and the like. The secondary cell may be rechargeable by a power source outside the air vehicle, for example. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be mounted in the air vehicle. The controller may be operable by an external power source even if the ignition switch is turned OFF.

The controller makes at least one determination selected from the group consisting of a determination as to whether or not the inclined angle of the or each fuel cell measured by the angle sensor, is equal to or more than a predetermined angle, a determination as to whether or not the gravity acceleration applied to the or each fuel cell measured by the gravity acceleration sensor, is equal to or more than a predetermined gravity acceleration, and a determination as to whether or not the output of the or each fuel cell measured by the output sensor, is less than a predetermined output.

The predetermined inclined angle of the or each fuel cell varies depending on the fuel cell position in the air vehicle, ant it also varies depending on the water discharge directions of the or each fuel cell. Accordingly, the inclined angle may be appropriately set considering the fuel cell position in the air vehicle, the water discharge directions of the or each fuel cell, and so on.

As the gravity acceleration applied to the or each fuel cell, examples include, but are not limited to, an input due to a wind from the outside of the air vehicle, etc., an impact induced by the shaking of the air vehicle induced by a change in its direction, etc., and a gravity applied by the inclination of the air vehicle. Accordingly, due to the gravity accelerations, the water discharge property may decrease depending on the water discharge directions of the or each fuel cell. Accordingly, the gravity acceleration applied to the or each fuel cell may be appropriately set considering the gravity accelerations, the water discharge directions of the or each fuel cell, and so on.

The predetermined output value of the or each fuel cell may be appropriately set according to the output required from the air vehicle.

When the controller determines that any one of the following conditions is satisfied, the controller increases a fuel gas supply from the fuel gas supplier to the or each fuel cell satisfying the condition: a condition that the inclined angle of the or each fuel cell is equal to or more than the predetermined angle, a condition that the gravity acceleration applied to the or each fuel cell is equal to or more than the predetermined gravity acceleration, and a condition that the output of the or each fuel cell is less than the predetermined output.

The increased fuel gas supply is not particularly limited, as long as it is larger than the fuel gas supply at the time of determination or the latest fuel gas supply. Considering fuel efficiency, it may be appropriately set within a range in which normal power generation is maintained.

Accordingly, the generated water discharge property is increased by temporarily increasing the fuel gas flow rate according to the inclined angle of the or each fuel cell mounted in the air vehicle, the size and direction of the input G, the output of the or each fuel cell, and so on.

From the viewpoint of fuel efficiency, the fuel gas flow rate of only the fuel cell being in need of securing the water discharge property, may be temporarily increased.

Figure 3:
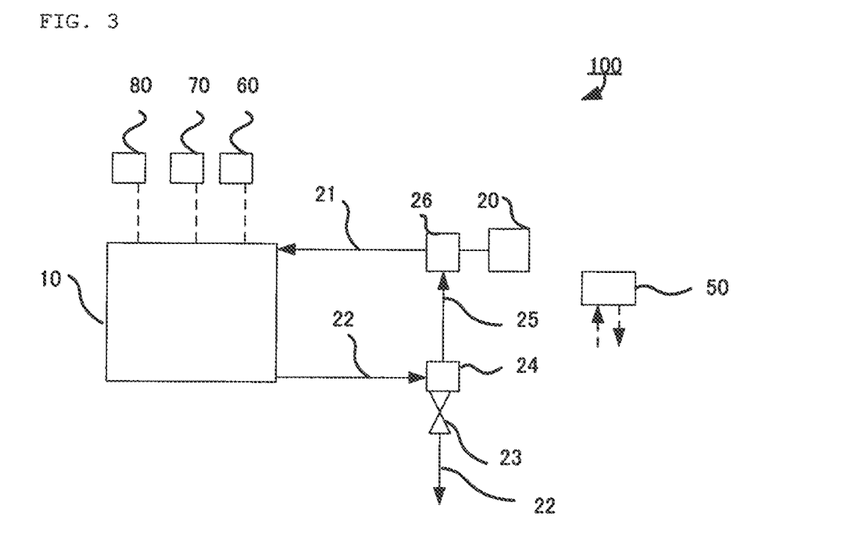
FIG. 3 is a schematic configuration diagram of an example of the fuel cell system of the present disclosure.

FIG. 3 is a schematic configuration diagram of an example of the fuel cell system of the present disclosure.

A fuel cell system 100 shown in FIG. 3 includes a fuel cell 10, a fuel gas supplier 20, a fuel gas supply flow path 21, a fuel off-gas discharge flow path 22, a gas and water discharge valve 23, a gas-liquid separator 24, a circulation flow path 25, an ejector 26, a controller 50, an angle sensor 60, a gravity acceleration sensor 70, and an output sensor 80. In FIG. 3, only the fuel gas system is illustrated, and other systems such as the oxidant gas system and the cooling system are not illustrated.

Figure 4:
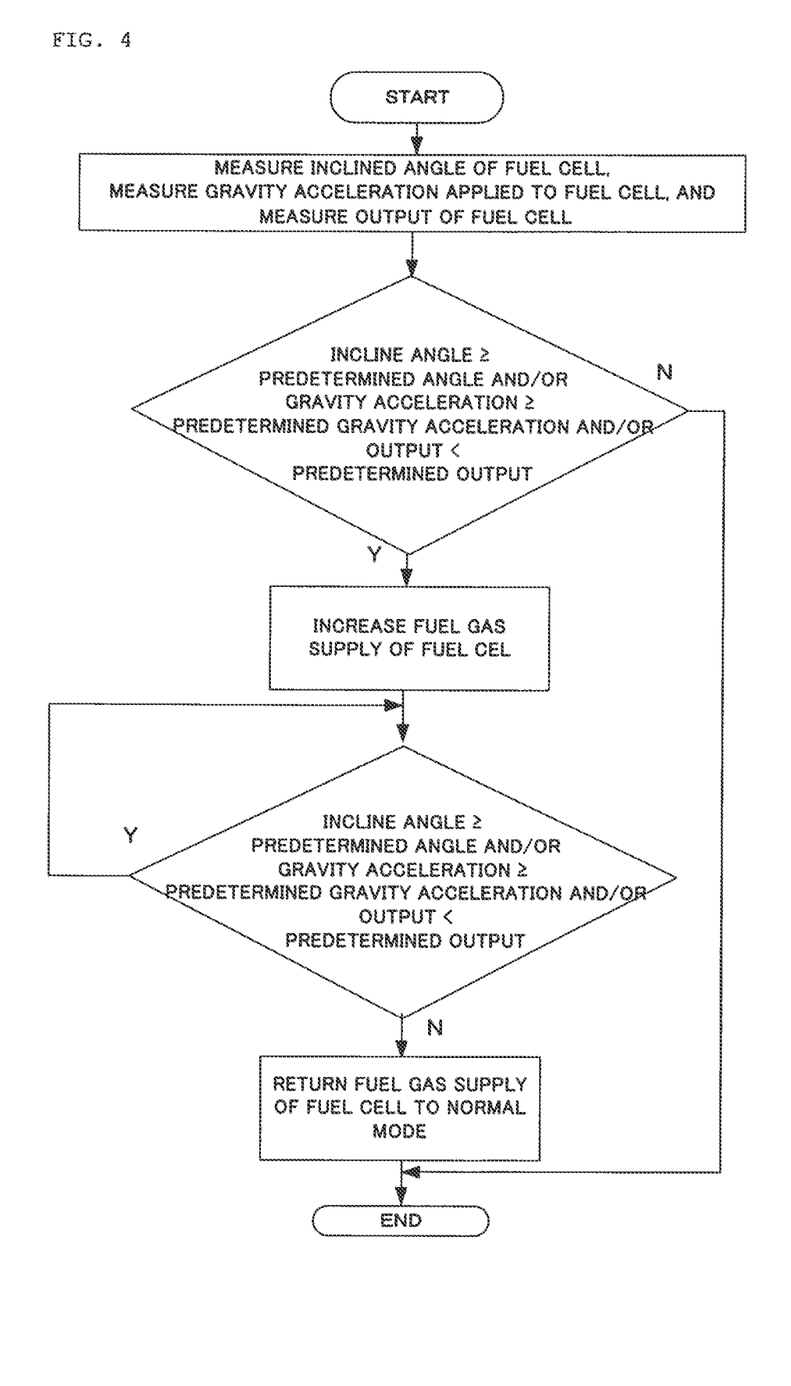
FIG. 4 is a flowchart illustrating an example of control of the fuel cell system of the present disclosure.

FIG. 4 is a flowchart illustrating an example of control of the fuel cell system of the present disclosure.

First, the angle sensor measures the inclined angle of the or each fuel cell; the gravity acceleration sensor measures the gravity acceleration applied to the or each fuel cell; and the output sensor measures the output of the or each fuel cell. The controller may monitor the inclined angle of the or each fuel cell measured by the angle sensor, the gravity acceleration applied to the or each fuel cell measured by the gravity acceleration sensor, and the output of the or each fuel cell measured by the output sensor.

The controller makes at least one determination selected from the group consisting of the determination as to whether or not the inclined angle of the or each fuel cell measured by the angle sensor, is equal to or more than the predetermined angle, the determination as to whether or not the gravity acceleration applied to the or each fuel cell measured by the gravity acceleration sensor, is equal to or more than the predetermined gravity acceleration, and the determination as to whether or not the output of the or each fuel cell measured by the output sensor, is less than the predetermined output.

Then, when the controller determines that all of the following conditions are not satisfied, the controller may end the control or may maintain the latest fuel gas supply from the fuel gas supplier to the or each fuel cell not satisfying the conditions (that is, may maintain the normal fuel gas supply mode): the condition that the inclined angle of the or each fuel cell is equal to or more than the predetermined angle, the condition that the gravity acceleration applied to the or each fuel cell is equal to or more than the predetermined gravity acceleration, and the condition that the output of the or each fuel cell is less than the predetermined output.

On the other hand, when the controller determines that any one of the following conditions is satisfied, the controller increases the fuel gas supply from the fuel gas supplier to the or each fuel cell satisfying the condition: the condition that the inclined angle of the or each fuel cell is equal to or more than the predetermined angle, the condition that the gravity acceleration applied to the or each fuel cell is equal to or more than the predetermined gravity acceleration, and the condition that the output of the or each fuel cell is less than the predetermined output.

Next, the controller again makes at least one determination selected from the group consisting of the determination as to whether or not the inclined angle of the or each fuel cell measured by the angle sensor, is equal to or more than the predetermined angle, the determination as to whether or not the gravity acceleration applied to the or each fuel cell measured by the gravity acceleration sensor, is equal to or more than the predetermined gravity acceleration, and the determination as to whether or not the output of the or each fuel cell measured by the output sensor, is less than the predetermined output.

Then, when the controller determines that all of the following conditions are not satisfied, the controller returns the fuel gas supply to the normal mode and ends the control: the condition that the inclined angle of the or each fuel cell is equal to or more than the predetermined angle, the condition that the gravity acceleration applied to the or each fuel cell is equal to or more than the predetermined gravity acceleration, and the condition that the output of the or each fuel cell is less than the predetermined output. Meanwhile, the controller continues to increase the fuel gas supply from the fuel gas supplier to the or each fuel cell higher than normal times, until all of the above conditions are found not to be satisfied.

The time to make the determination again, may be the time just after the first determination. The controller may always make the determination.

3. Third Embodiment

The air vehicle of the present disclosure is an air vehicle, wherein the air vehicle comprises a fuel cell system;
wherein the fuel cell system comprises:
 a fuel cell,
 a fuel gas system for supplying fuel gas to the fuel cell,
 an angle sensor for measuring an inclined angle of the fuel cell,
 a gravity acceleration sensor for measuring a gravity acceleration applied to the fuel cell,
 an output sensor for measuring an output of the fuel cell, and
 a controller;
wherein the fuel gas system comprises a fuel gas supplier;
wherein the controller makes at least one determination selected from the group consisting of a determination as to whether or not the inclined angle of the fuel cell measured by the angle sensor, is equal to or more than a predetermined angle, a determination as to whether or not the gravity acceleration applied to the fuel cell measured by the gravity acceleration sensor, is equal to or more than a predetermined gravity acceleration, and a determination as to whether or not the output of the fuel cell measured by the output sensor, is less than a predetermined output; and wherein, when the controller determines that any one of the following conditions is satisfied, the controller increases a fuel gas supply from the fuel gas supplier to the fuel cell satisfying the condition: a condition that the inclined angle of the fuel cell is equal to or more than the predetermined angle, a condition that the gravity acceleration applied to the fuel cell is equal to or more than the predetermined gravity acceleration, and a condition that the output of the fuel cell is less than the predetermined output.

In the air vehicle of the third embodiment, the generated water discharge property is increased by temporarily increasing the fuel gas flow rate according to the inclined angle of the fuel cell mounted in the air vehicle, the size and direction of the input. G, and the output of the fuel cell.

From the viewpoint of fuel efficiency, the fuel gas flow rate of only the fuel cell being in need for securing the water discharge property, is temporarily increased.

As the fuel cell system and so on of the third embodiment, examples include, but are not limited to, those exemplified above in the first and second embodiments.

The air vehicle of the present disclosure may include two or more fuel cells; each fuel cell may include an anode outlet manifold; and each fuel cell may be disposed in the air vehicle so that the water discharge directions of the anode outlet manifolds are different from each other.

Accordingly, the generated water discharge property of the fuel cells is increased, and the power output of the fuel cells is further stabilized.

The air vehicle of the present disclosure may include one or more fuel cells; the or each cell may include an anode outlet manifold; and the or each fuel cell may be disposed in the air vehicle so that the water discharge direction of the anode outlet manifold is the same direction as the travel direction of the air vehicle.

Accordingly, the generated water discharge property of the or each fuel cell is increased, and the power output of the or each fuel cell is further stabilized.

In the air vehicle of the present disclosure, the or each fuel cell may include a rotation axis which is freely rotatable with respect to the air vehicle.

The rotation axis may be disposed on the opposite side to the water discharge direction, with respect to the gravity center of the or each fuel cell.

Accordingly, the generated water discharge property of the or each fuel cell is further increased, and the power output of the or each fuel cell is further stabilized.

As the rotation axis and so on of the third embodiment, examples include, but are not limited to, those exemplified above in the second embodiment.

REFERENCE SIGNS LIST

10. Fuel cell
11. Fuel cell
12. Rotation axis
13. Gravity center
15. Water (generated water)
20. Fuel gas supplier
21. Fuel gas supply flow path
22. Fuel off-gas discharge flow path
23. Gas and water discharge valve
24. Gas-liquid separator
25. Circulation flow path
26. Ejector
50. Controller
60. Angle sensor
70. Gravity acceleration sensor
80. Output sensor
100. Fuel cell system

The invention claimed is:

1. An air vehicle,
wherein the air vehicle comprises two or more fuel cells;
wherein each fuel cell comprises an anode outlet manifold;
wherein each fuel cell is disposed in the air vehicle so that water discharge directions of the anode outlet manifolds are different from each other;
wherein the air vehicle further comprises a fuel cell system;
wherein the fuel cell system comprises:
the two or more fuel cells,
a fuel gas system for supplying fuel gas to each fuel cell,
an angle sensor for measuring an inclined angle of each fuel cell,
a gravity acceleration sensor for measuring a gravity acceleration applied to each fuel cell,
an output sensor for measuring an output of each fuel cell, and
a controller;
wherein the fuel gas system comprises a fuel gas supplier;
wherein the controller makes at least one determination selected from the group consisting of a determination as to whether or not the inclined angle of each fuel cell measured by the angle sensor, is equal to or more than a predetermined angle, a determination as to whether or not the gravity acceleration applied to each fuel cell measured by the gravity acceleration sensor, is equal to or more than a predetermined gravity acceleration, and a determination as to whether or not the output of each fuel cell measured by the output sensor, is less than a predetermined output; and
wherein, when the controller determines that any one of the following conditions is satisfied, the controller increases a fuel gas supply from the fuel gas supplier to each fuel cell satisfying the condition: a condition that the inclined angle of each fuel cell is equal to or more than the predetermined angle, a condition that the gravity acceleration applied to the or each fuel cell is equal to or more than the predetermined gravity acceleration, and a condition that the output of each fuel cell is less than the predetermined output.

2. The air vehicle according to claim 1, wherein the air vehicle is an airplane or a vertical takeoff and landing aircraft.

3. An air vehicle,
wherein the air vehicle comprises one or more fuel cells;
wherein the or each fuel cell comprises an anode outlet manifold;
wherein the or each fuel cell is disposed in the air vehicle so that a water discharge direction of the anode outlet manifold is the same direction as a travel direction of the air vehicle;
wherein the air vehicle further comprises a fuel cell system;

wherein the fuel cell system comprises:
the one or more fuel cells,
a fuel gas system for supplying fuel gas to the or each fuel cell,
an angle sensor for measuring an inclined angle of the or each fuel cell,
a gravity acceleration sensor for measuring a gravity acceleration applied to the or each fuel cell,
an output sensor for measuring an output of the or each fuel cell, and
a controller;
wherein the fuel gas system comprises a fuel gas supplier;
wherein the controller makes at least one determination selected from the group consisting of a determination as to whether or not the inclined angle of the or each fuel cell measured by the angle sensor, is equal to or more than a predetermined angle, a determination as to whether or not the gravity acceleration applied to the or each fuel cell measured by the gravity acceleration sensor, is equal to or more than a predetermined gravity acceleration, and a determination as to whether or not the output of the or each fuel cell measured by the output sensor, is less than a predetermined output; and
wherein, when the controller determines that any one of the following conditions is satisfied, the controller increases a fuel gas supply from the fuel gas supplier to the or each fuel cell satisfying the condition: a condition that the inclined angle of the or each fuel cell is equal to or more than the predetermined angle, a condition that the gravity acceleration applied to the or each fuel cell is equal to or more than the predetermined gravity acceleration, and a condition that the output of the or each fuel cell is less than the predetermined output.

4. The air vehicle according to claim 3,
wherein the or each fuel cell comprises a rotation axis which is freely rotatable with respect to the air vehicle, and
wherein the rotation axis is disposed on an opposite side to the water discharge direction, with respect to a gravity center of the or each fuel cell.

* * * * *